US011759892B2

(12) United States Patent
Song et al.

(10) Patent No.: US 11,759,892 B2
(45) Date of Patent: Sep. 19, 2023

(54) ADDITIVE MANUFACTURING DEVICE FOR CAST-ROLLING WITH LASER CLADDING

(71) Applicant: Yanshan University, Qinhuangdao (CN)

(72) Inventors: Jianfeng Song, Qinhuangdao (CN); Wenwu Wang, Qinhuangdao (CN); Younian Song, Qinhuangdao (CN); Yinggang Shi, Qinhuangdao (CN); Dong Wang, Qinhuangdao (CN); Xuan He, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 436 days.

(21) Appl. No.: 16/952,318

(22) Filed: Nov. 19, 2020

(65) Prior Publication Data

US 2021/0205929 A1 Jul. 8, 2021

(30) Foreign Application Priority Data

Nov. 19, 2019 (CN) .......................... 201911137514.0

(51) Int. Cl.
*B23K 26/342* (2014.01)
*B33Y 30/00* (2015.01)
*B23K 26/08* (2014.01)
B23K 103/04 (2006.01)
B23K 101/04 (2006.01)

(52) U.S. Cl.
CPC ........ *B23K 26/342* (2015.10); *B23K 26/0876* (2013.01); *B33Y 30/00* (2014.12); *B23K 2101/04* (2018.08); *B23K 2103/04* (2018.08)

(58) Field of Classification Search
CPC ............. B23K 26/0876; B23K 26/342; B23K 2103/04; B23K 2104/04; B23K 26/00; B33Y 30/00
USPC .... 219/121.69, 121.68, 121.67, 161, 121.39, 219/121.4, 121.41
See application file for complete search history.

(56) References Cited

U.S. PATENT DOCUMENTS

| | | | | |
|---|---|---|---|---|
| 9,168,613 | B2* | 10/2015 | Colby | B23K 26/32 |
| 2011/0061591 | A1* | 3/2011 | Stecker | B33Y 40/00 |
| | | | | 118/663 |
| 2014/0363327 | A1* | 12/2014 | Holcomb | B23K 37/0461 |
| | | | | 219/76.1 |
| 2020/0086388 | A1* | 3/2020 | Zediker | B23K 26/032 |

FOREIGN PATENT DOCUMENTS

CN 107825407 * 3/2018 ......... B25J 15/0052

* cited by examiner

*Primary Examiner* — Phuong T Nguyen
(74) *Attorney, Agent, or Firm* — IPRO, PLLC; Na Xu

(57) ABSTRACT

A wall-thickness additive manufacturing device for micro cast-rolling additive manufacturing of large-scale special-shaped pipe, includes: a vertical wall, a heat-insulating cover, a crossed slide assembly and a laser cladding assembly. The vertical wall is horizontally provided on the ground; the crossed slide assembly is fixedly connected to the vertical wall; the laser cladding assembly is fixedly connected to the crossed slide assembly; the vertical wall has a shape of a T-shaped structure. The present invention uses laser welding to solve the problem of heat preservation of the processed workpiece in the process of wall-thickness forming and additive manufacturing.

1 Claim, 5 Drawing Sheets

ADDITIVE MANUFACTURING DEVICE FOR CAST-ROLLING WITH LASER CLADDING

TECHNICAL FIELD

The present invention relates to the field of near-net-shaping and additive manufacturing of special-shaped steel pipe for large-scale connecting pipes used in nuclear power, and in particular, to a wall-thickness additive manufacturing device for micro cast-rolling additive manufacturing of large-scale special-shaped pipe.

BACKGROUND

Large-scale special-shaped connecting pipes for nuclear power are mainly used in nuclear power generators. They have special materials, irregular inner holes and irregular shapes and complex shapes, and because they need to withstand high temperature and high pressure steam under working conditions, they have strict requirements on microstructure and internal defects. Currently, they mainly rely on forging process to produce. The forging process has a long production process and a complex process, requiring large-scale forging equipment and flaw detection devices, so the production cost of large-scale connecting pipes remains high. Large-scale steel pipes with irregular shapes are often used in industrial production. Due to their special shapes and large volume, compared to the common regular shape steel pipes in daily life that are manufactured by casting and rolling and other long process methods, they can be produced by welding when the shapes are regular and the wall thicknesses are small. With the development of science and technology, a more advanced near-net-shaping manufacturing method such as additive manufacturing has emerged, which can greatly shorten the manufacturing process and reduce intermediate links. At the same time, it can effectively control internal organization and defects, and can significantly reduce product production costs. For the manufacture of large irregular steel pipes, corresponding manufacturing equipment must be designed.

In actual manufacturing, the size of the processed workpiece is often very large, and it needs to be processed in several steps, which causes the production process to be time-consuming and laborious. To solve this problem, it is necessary to improve and optimize the forming structure of additive manufacturing.

SUMMARY

In view of the problems in the prior art, the present invention provides a wall-thickness additive manufacturing device for micro cast-rolling additive manufacturing of large-scale special-shaped pipe. It is the first time to use laser cladding to solve the problem of heat preservation of the processed workpiece in the process of wall-thickness forming and additive manufacturing, which reduces the processing cost and improves the product yield rate.

The present invention provides a wall-thickness additive manufacturing device for micro cast-rolling additive manufacturing of large-scale special-shaped pipe, and the device comprises: a vertical wall, a heat-insulating cover, a crossed slide assembly and a laser cladding assembly. The vertical wall is horizontally provided on the ground; the crossed slide assembly is fixedly connected to the vertical wall by bolt; the laser cladding assembly is fixedly connected to an upper part of a longitudinal slide of the crossed slide assembly by bolt. The vertical wall has a shape of a T-shaped structure; the heat-insulating cover comprises a heat-insulating cover base, a heat-insulating right cover portion and a heat-insulating left cover portion; the heat-insulating right cover portion and the heat-insulating left cover portion are connected to an upper part of the heat-insulating cover base by pin; the crossed sliding platform assembly comprises a transverse slide structure, a longitudinal slide structure, a hexagon nut and a hexagon bolt. The longitudinal slide structure comprises a first ball screw bearing seat, a longitudinal slide, a longitudinal slide guide, a first stepping motor, a first ball screw, a first crash pad, a first coupling, a first longitudinal ball screw nut, a second longitudinal ball screw nut, a first stepping motor seat and a first bearing end cover. The transverse slide structure comprises a second ball screw bearing seat, a transverse slide, a transverse slide guide, a second ball screw, a second stepping motor, a second coupling, a second crash pad, a first transverse ball screw nut, a second transverse ball screw nut, a second stepping motor seat and a second bearing end cover. The transverse slide and the longitudinal slide each have a cross section of U-shaped structure, a lower part of the transverse slide is slidingly connected to an upper part of the transverse slide guide, a lower part of the longitudinal slide guide is fixedly connected to an upper part of the transverse slide, a lower part of the longitudinal slide is slidingly connected to the upper part of the longitudinal slide guide, and the first stepping motor seat and the second stepping motor seat are respectively fixedly connected to one end of the longitudinal slide guide and one end of the transverse slide guide, the first stepping motor and the second stepping motor are respectively fixedly connected to the first end of the first stepping motor seat and the first end of the second stepping motor seat, and one end of the first crash pad and one end of the second crash pad are respectively fixedly connected to a second end of the first stepping motor seat and a second end of the second stepping motor seat, and the first ball screw and the second ball screw are respectively in thread connection with the first longitudinal ball screw nut, the second longitudinal ball screw nut, the first transverse ball screw nut and the second transverse ball screw nut. The laser cladding assembly comprises a welding frame, a storage barrel, a conical pin, a laser head, and a welding head, the welding frame has a shape of an oblique T-shaped structure, the storage barrel is fixedly connected to the welding frame, a top surface of the storage barrel is flush with a lower surface of a cantilever end of the welding frame, the laser head is connected to a lower surface of the cantilever end of the welding frame through the conical pin, and the welding head is fixedly connected to the lower surface of the cantilever end of the welding frame.

Compared with the prior art, the present invention has the advantages as follows.

First, it solves the problem that the processing cannot be completed at one time due to the large overall size of the processed workpiece. The device realizes full coverage of the working area. For different processed workpieces, the working area of the laser cladding device can be adjusted according to its size.

Second, the structure is simple, and the parts used are all commonly used mechanical parts, which is convenient for disassembly and maintenance.

Figure 1:
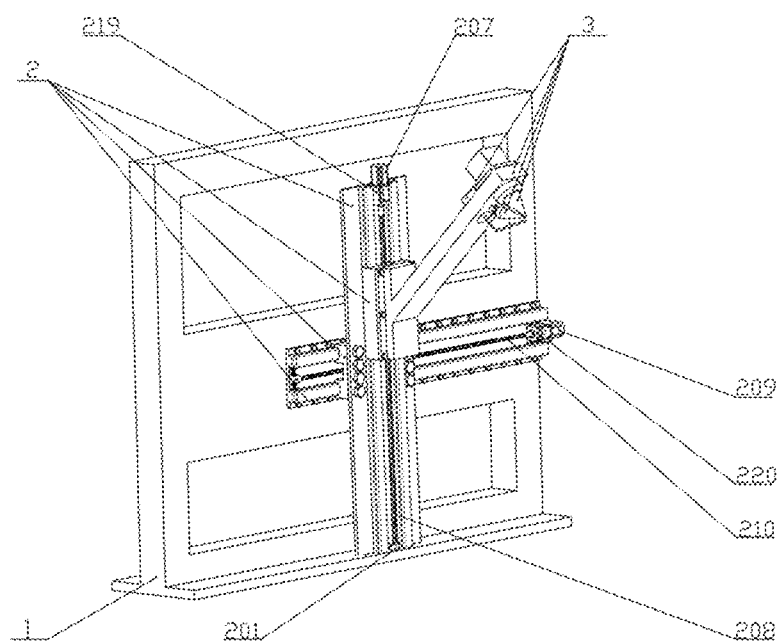
FIG. 1 is an overall schematic diagram of a wall-thickness additive manufacturing device for micro cast-rolling additive manufacturing of large-scale special-shaped pipe according to the present invention.

MAIN REFERENCE SIGNS vertical wall 1, crossed slide assembly 2, first ball screw bearing seat 201, second ball screw bearing seat 202, transverse slide 203, transverse slide guide 204, longitudinal slide 205, longitudinal slide guide 206, first stepping motor 207, first ball screw 208, second stepping motor 209, second ball screw 210, first coupling 211, second coupling 212, first crash pad 213, second crash pad 214, first transverse ball screw nut 215, second transverse ball screw nut 216, first longitudinal ball screw nut 217, second longitudinal ball screw nut 218, first stepping motor seat 219, second stepping motor seat 220, first bearing end cover 221, second bearing end cover 222, hexagon bolt 223, hexagon nut 224, laser cladding assembly 3, welding frame 301, storage barrel 302, conical pin 303, laser head 304, welding head 305, heat-insulating cover assembly 4, heat-insulating cover base 401, heat-insulating right cover portion 402, heat-insulating left cover portion 403.

DETAILED DESCRIPTION OF EMBODIMENTS

In order to detail the technical contents, structural features, achieved objectives and effects of the present invention, a detailed description will be given below in conjunction with the accompanying drawings of the specification.

The present invention provides a wall-thickness additive manufacturing device for micro cast-rolling additive manufacturing of large-scale special-shaped pipe. As shown in FIG. 1, the device comprises: a vertical wall 1, a heat-insulating cover 4, a crossed slide assembly 2 and a laser cladding assembly 3. The vertical wall 1 is horizontally provided on the ground; the crossed slide assembly 2 is fixedly connected to the vertical wall 1 by bolt; the laser cladding assembly 3 is fixedly connected to an upper part of a longitudinal slide 205 of the crossed slide assembly 2 by bolt.

Figure 10:
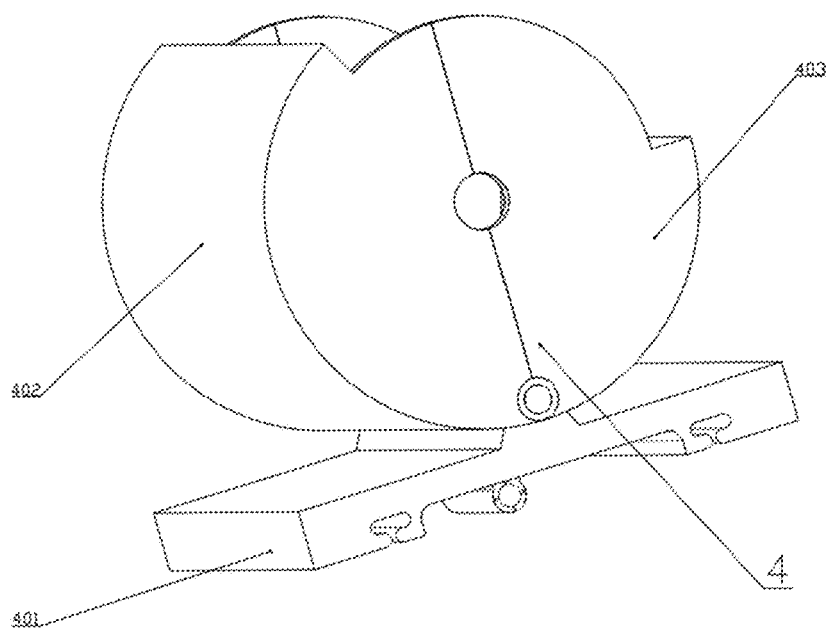
FIG. 10 is an overall schematic diagram of a protective cover in the wall-thickness additive manufacturing device for micro cast-rolling additive manufacturing of large-scale special-shaped pipe according to the present invention.

As shown in FIG. 1, the vertical wall 1 has a shape of a T-shaped structure. As shown in FIG. 10, the heat-insulating cover 4 comprises a heat-insulating cover base 401, a heat-insulating right cover portion 402 and a heat-insulating left cover portion 403. The heat-insulating right cover portion 402 and the heat-insulating left cover portion 403 are connected to an upper part of the heat-insulating cover base 401 by pin.

Figure 2:
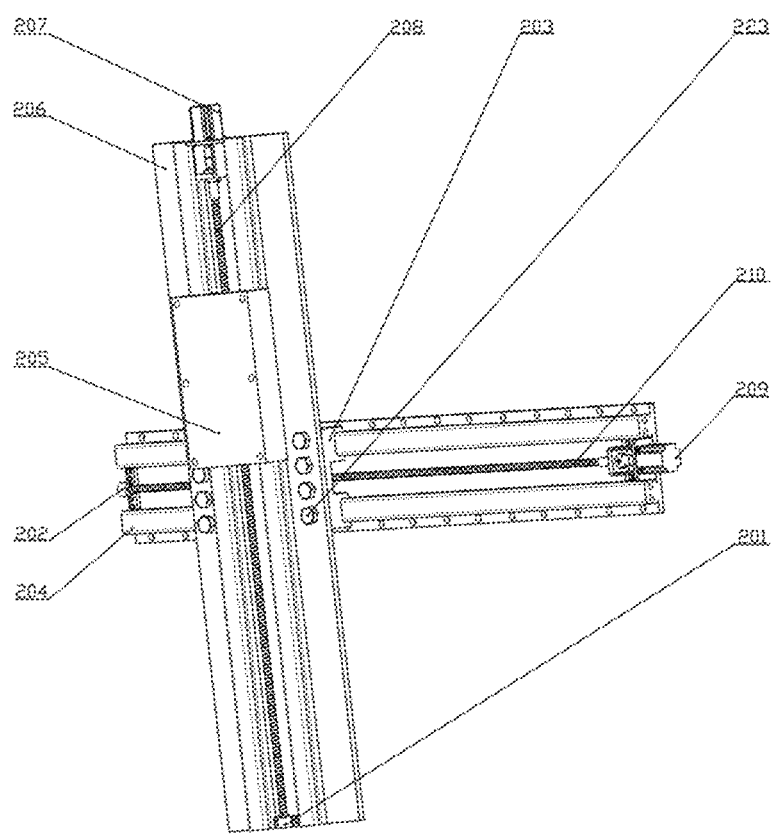
FIG. 2 is an overall schematic diagram of a crossed slide assembly in the wall-thickness additive manufacturing device for micro cast-rolling additive manufacturing of large-scale special-shaped pipe according to the present invention.
Figure 3:
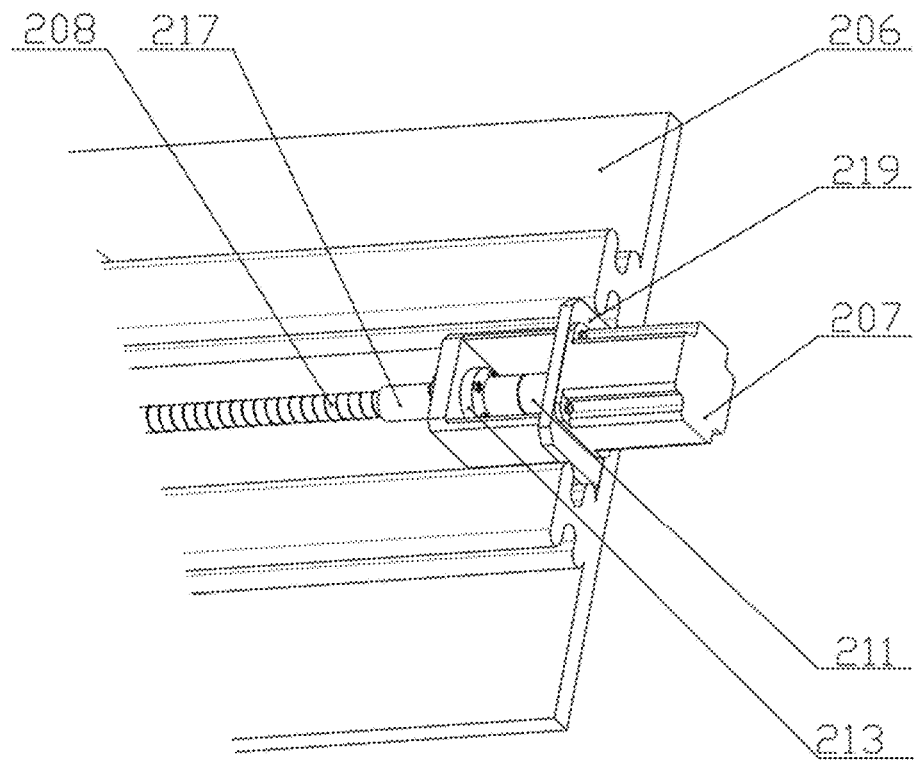
FIG. 3 is a partial schematic diagram of a motor end of a transverse slide structure in the wall-thickness additive manufacturing device for micro cast-rolling additive manufacturing of large-scale special-shaped pipe according to the present invention.
Figure 4:
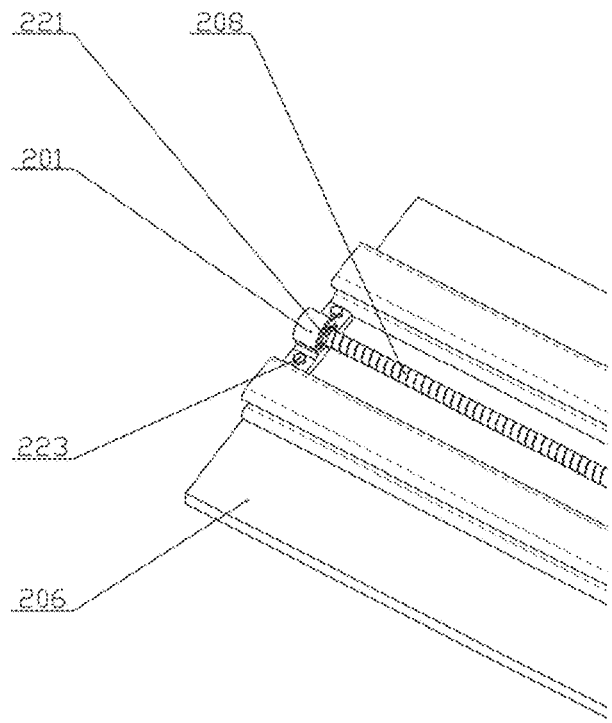
FIG. 4 is a partial schematic diagram of a free end of the transverse slide structure in the wall-thickness additive manufacturing device for micro cast-rolling additive manufacturing of large-scale special-shaped pipe according to the present invention.
Figure 5:
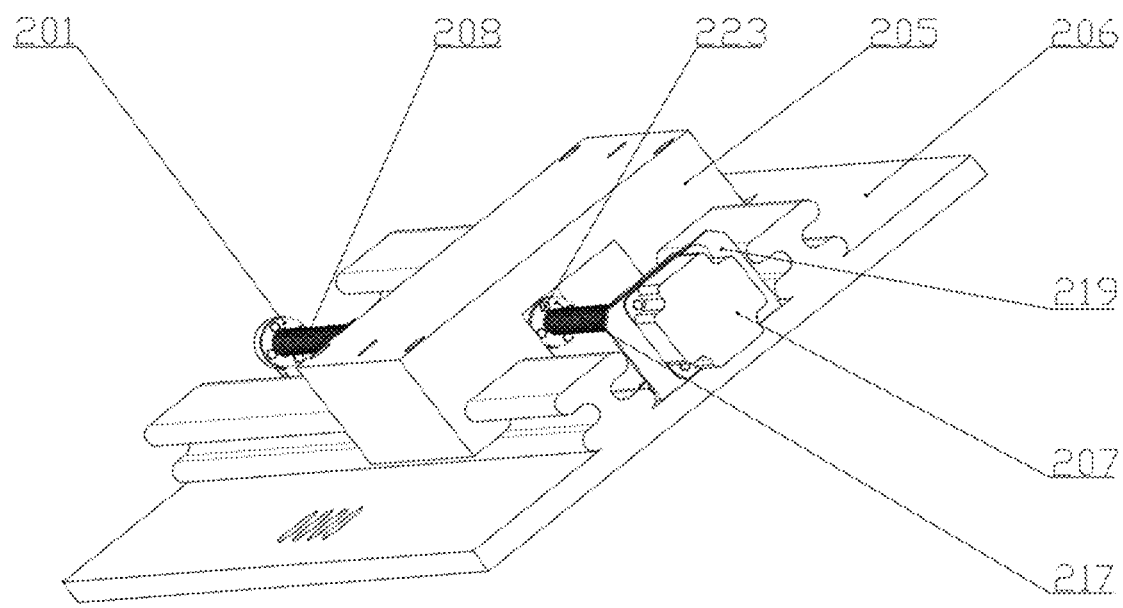
FIG. 5 is an overall schematic diagram of the transverse slide structure in the wall-thickness additive manufacturing device for micro cast-rolling additive manufacturing of large-scale special-shaped pipe according to the present invention.

As shown in FIG. 2, the crossed sliding platform assembly 2 comprises a transverse slide structure, a longitudinal slide structure, a hexagon nut 224 and a hexagon bolt 223. As shown in FIG. 3, FIG. 4 and FIG. 5, the longitudinal slide structure comprises a first ball screw bearing seat 201, a longitudinal slide 205, a longitudinal slide guide 206, a first stepping motor 207, a first ball screw 208, a first crash pad 213, a first coupling 211, a first longitudinal ball screw nut 207, a second longitudinal ball screw nut 208, a first stepping motor seat 219 and a first bearing end cover 221.

Figure 6:
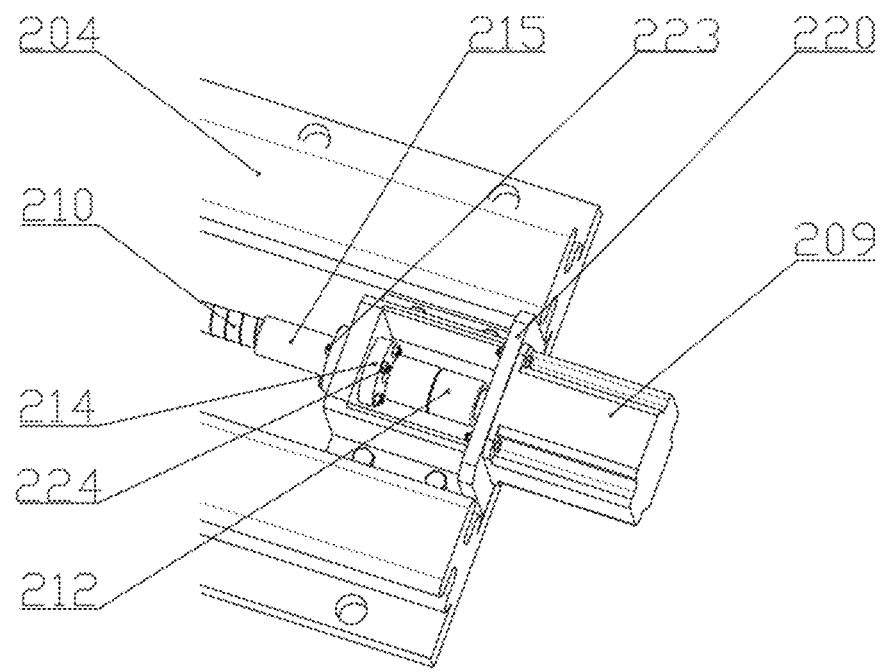
FIG. 6 is a partial schematic diagram of a motor end of a longitudinal slide structure in the wall-thickness additive manufacturing device for micro cast-rolling additive manufacturing of large-scale special-shaped pipe according to the present invention.
Figure 7:
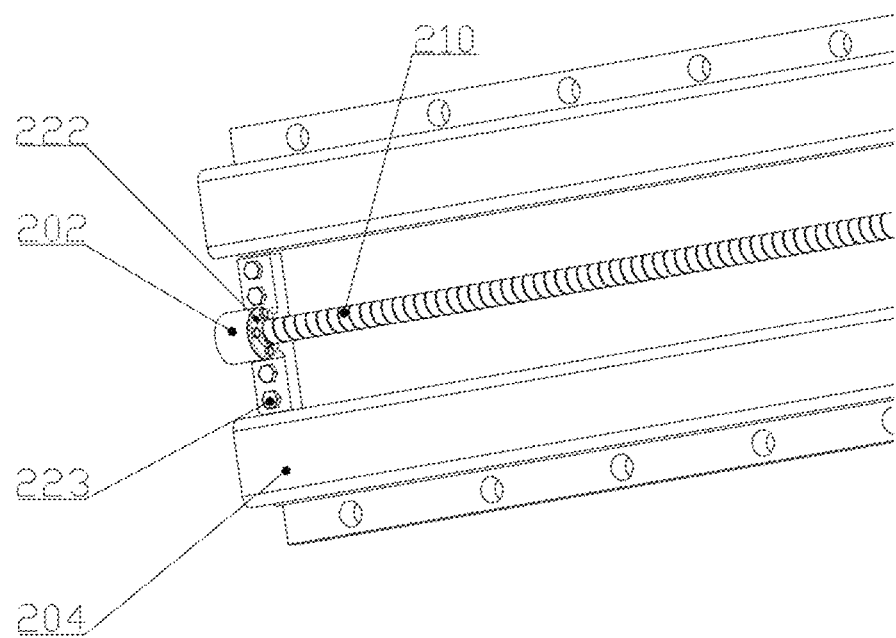
FIG. 7 is a partial schematic diagram of a free end of the longitudinal slide structure in the wall-thickness additive manufacturing device for micro cast-rolling additive manufacturing of large-scale special-shaped pipe according to the present invention.
Figure 8:
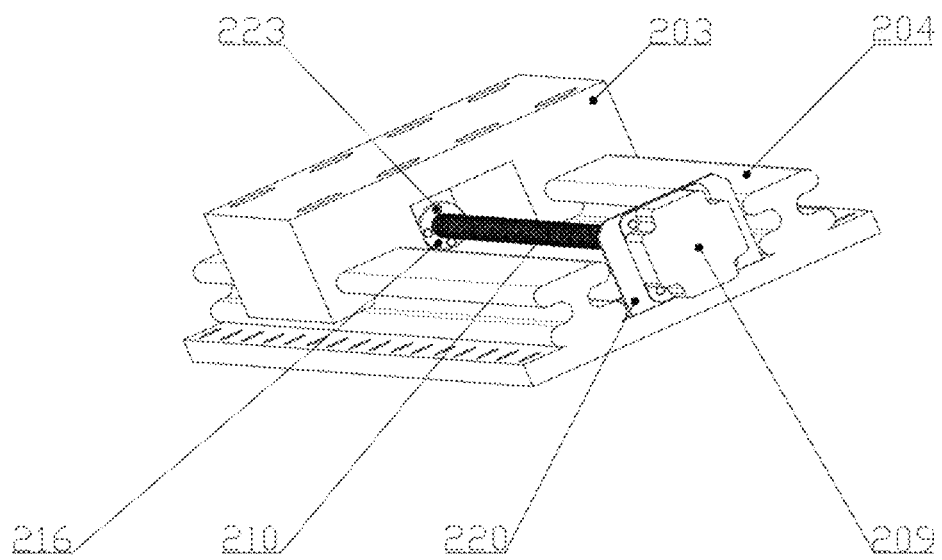
FIG. 8 is an overall schematic diagram of the longitudinal slide structure in the wall-thickness additive manufacturing device for micro cast-rolling additive manufacturing of large-scale special-shaped pipe according to the present invention.

As shown in FIG. 6, FIG. 7 and FIG. 8, the transverse slide structure comprises a second ball screw bearing seat 202, a transverse slide 203, a transverse slide guide 204, a second ball screw 210, a second stepping motor 209, a second coupling 212, a second crash pad 214, a first transverse ball screw nut 215, a second transverse ball screw nut 216, a second stepping motor seat 220 and a second bearing end cover 222.

As shown in FIG. 2, the transverse slide 203 and the longitudinal slide 204 each have a cross section of U-shaped structure, a lower part of the transverse slide 203 is slidingly connected to an upper part of the transverse slide guide 204, a lower part of the longitudinal slide guide 206 is fixedly connected to an upper part of the transverse slide 203, and a lower part of the longitudinal slide 205 is slidingly connected to the upper part of the longitudinal slide guide 206.

As shown in FIG. 3 and FIG. 6, the first stepping motor seat 219 and the second stepping motor seat 220 are respectively fixedly connected to one end of the longitudinal slide guide 206 and one end of the transverse slide guide 204, the first stepping motor 207 and the second stepping motor 209 are respectively fixedly connected to the first end of the first stepping motor seat 219 and the first end of the second stepping motor seat 220, and one end of the first crash pad 213 and one end of the second crash pad 214 are respectively fixedly connected to a second end of the first stepping motor seat 219 and a second end of the second stepping motor seat 220, and the first ball screw 208 and the second ball screw 210 are respectively in thread connection with the first longitudinal ball screw nut 217, the second longitudinal ball screw nut 218, the first transverse ball screw nut 215 and the second transverse ball screw nut 216.

Figure 9:
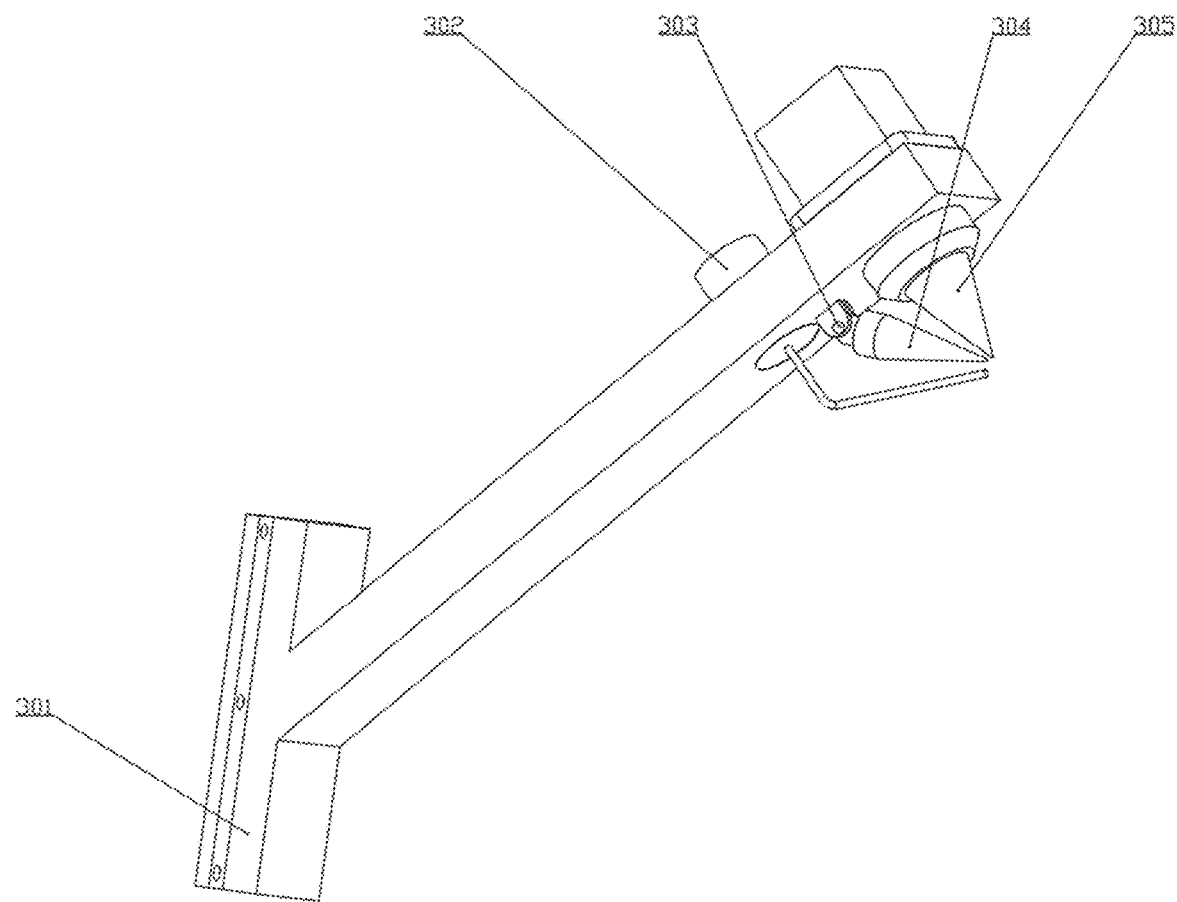
FIG. 9 is an overall schematic diagram of a laser cladding assembly in the wall-thickness additive manufacturing device for micro cast-rolling additive manufacturing of large-scale special-shaped pipe according to the present invention.

As shown in FIG. 9, the laser cladding assembly 3 comprises a welding frame 301, a storage barrel 302, a conical pin 303, a laser head 304, and a welding head 305, the welding frame 301 has a shape of an oblique T-shaped structure, the storage barrel 302 is fixedly connected to the welding frame 301, a top surface of the storage barrel 302 is flush with a lower surface of a cantilever end of the welding frame 301, the laser head 304 is connected to a lower surface of the cantilever end of the welding frame 301 through the conical pin 303, and the welding head 305 is fixedly connected to the lower surface of the cantilever end of the welding frame 301.

In the longitudinal slide structure, as shown in FIG. 4 and FIG. 5, an input end of the first ball screw 208 passes through an inner diameter of the second longitudinal ball screw nut 218 and an inner diameter of the first crash pad 213 and is connected to an output shaft of the first stepping motor 207 through the first coupling 211, and a free end of the first ball screw 208 is fixedly connected to the longitudinal slide guide 206 through the first ball screw bearing seat 201 and the first bearing end cover 221, the first longitudinal ball screw nut 217 is fixedly connected to a first end of the first stepping motor seat 207, an outer diameter of the second longitudinal ball screw nut 218 is fixedly connected to an inner surface of the longitudinal slide 205.

In the transverse slide structure, as shown in FIG. 7 and FIG. 8, an input end of the second ball screw 210 passes through an inner diameter of the second transverse ball screw nut 216 and an inner diameter of the second crash pad 214 and is connected to an output shaft of the second stepping motor 209 through the second coupling 212, and a free end of the second ball screw 210 is fixedly connected to the transverse slide guide 204 through the second ball screw bearing seat 202 and the second bearing end cover 222, the first transverse ball screw nut 215 is fixedly connected to a first end of the second stepping motor seat 220, an outer diameter of the second transverse ball screw nut 216 is fixedly connected to an inner surface of the transverse slide 203.

As shown in FIG. 9, a distance between the storage barrel 302 and a top surface of the cantilever end of the welding frame 301 is greater than a distance between the laser head 304 and the top surface of the cantilever end of the welding frame 301, and a distance between the laser head 304 and the top surface of the cantilever end of the welding frame 301 is greater than a distance between the welding head 305 and the top surface of the cantilever end of the welding frame 301, and a width of the longitudinal slide guide 206 is equal to a width of the transverse slide 203.

The longitudinal slide guide 206 and the transverse slide guide 204 are perpendicular to each other, and an axis of the first ball screw 208 is perpendicular to an axis of the second ball screw 210.

Fixed connections in the crossed slide assembly 2 are all connected by hexagon bolts 223 and hexagon nuts 224, and the number of the hexagon bolts 223 and the hexagon nuts 224 in the longitudinal slide structure is equal to the number of the hexagon bolts 223 and the hexagon nuts 224 in the transverse slide structure.

A wall-thickness additive manufacturing device for micro cast-rolling additive manufacturing of large-scale special-shaped pipe according to the present invention will be further described as follows in conjunction with embodiments.

When applying the device, the structure is assembled first. First, the first stepping motor seat 219 and second stepping motor seat 220 are respectively fixedly connected to one end of the longitudinal slide guide 206 and one end of the transverse slide guide 204, and are fixed with the hexagon bolt 223 and the hexagon nut 224. The first step motor 207 and the second step machine motor 209 are respectively fixedly connected to the first end of the first stepping motor seat 219 and the first end of the second stepping motor seat 220, and are fixed with the hexagon bolt 223 and the hexagon nut 224. One end of the first crash pad 213 and one end of the second crash pad 214 are respectively fixedly connected to the second end of the first stepping motor seat 219 and the second end of the second stepping motor seat 220.

Then, the input end of the first ball screw 208 is passed through the inner diameter of the second longitudinal ball screw nut 218 and the inner diameter of the first crash pad 213, respectively, and is connected to the output shaft of the first stepping motor 207 through the first coupling 211, hexagon bolt 223 and the hexagon nut 224. The free end of the first ball screw 208 is connected to the longitudinal slide guide 206 through the first ball screw bearing seat 201 and the first bearing end cover 221, respectively, and is fixed with the hexagon bolt 223 and the hexagon nut 224. The first longitudinal ball screw nut 217 is fixedly connected to the first end of the first stepping motor seat 207, and the outer diameter of the second longitudinal ball screw nut 218 is fixedly connected to the inner surface of the longitudinal slide 205.

Then, the input end of the second ball screw 210 is passed through the inner diameter of the second transverse ball screw nut 216 and the inner diameter of the second crash pad 214, respectively, and is connected to the output shaft of the second stepping motor 209 through the second coupling 212, the hexagon bolt 223 and the hexagon nut 224. The free ends of the second ball screw 210 is connected to the transverse slide guide 204 through the second ball screw bearing seat 202 and the second bearing end cover 222, respectively, and is fixed with the hexagon bolt 223 and the hexagon nut 224. The first transverse ball screw nut 215 is fixedly connected to the first end of the second stepping motor seat 220, and the outer diameter of the second transverse ball screw nut 216 is fixedly connected to the inner surface of the transverse slide 203.

Then, the lower part of the transverse slide 203 and the upper part of the transverse slide guide 204 are slidingly connected, the lower part of the longitudinal slide guide 206 and the upper part of the transverse slide 203 are fixedly connected, and the lower part of the longitudinal slide 205 and the upper part of the longitudinal slide guide 206 are slidingly connected, to form the crossed slide assembly 2.

Finally, the crossed slide assembly 2 is fixedly connected to the vertical wall 1 by bolts, and the laser cladding assembly 3 is fixedly connected to the upper part of the longitudinal slide 205 of the crossed slide assembly 2 by bolts, thereby completing the connection of the overall device.

When working with this device, the second stepping motor 209 is first started up, and the torque is transmitted to the second ball screw 210 through the second coupling 212, and the second ball screw 210 does the rotating motion. The external thread of the second ball screw 210 is mated with the internal thread of the second transverse ball screw nut 216, and the second transverse ball screw nut 216 is fixedly connected with the transverse slide 203. Driven by the second ball screw 210, the transverse slide 203 will slide along the transverse slide guide 204. Because the transverse slide 203 is driven by the second ball screw 210 to slide along the transverse slide guide 204, and the longitudinal slide guide 206 fixed on the transverse slide 203 as well as the parts fixedly connected thereon also move left and right in a plane parallel to the vertical wall 1.

Then, the first stepping motor 207 is started up, and the torque is transmitted to the first ball screw 208 through the first coupling 211, and the first ball screw 208 does the rotating motion. The external thread of the first ball screw 208 is mated with the internal thread of the second longitudinal ball screw nut 218. The second longitudinal ball screw nut 218 is fixedly connected with the longitudinal slide 205. Driven by the first ball screw 208, the longitudinal slide 205 will slide along the longitudinal slide guide 206, and the laser cladding assembly 3 fixedly connected to the longitudinal slide 203 T also follows the longitudinal sliding table 203 for longitudinal movement. With the above steps, the adjustability of the laser cladding working area can be realized.

Driven by the above crossed slide assembly 2, the welding frame 301 can move in four directions in the plane. The laser cladding material is sent to the surface of the processed workpiece through the storage barrel 302. The laser cladding material is first welded and formed by the welding head 305. Then the laser head 304 clads the thin layer of the formed substrate surface and the cladding material newly sent to the surface of the processed workpiece to form a new surface. The heat-insulating cover 4 plays a role of heat preservation during work.

The above-mentioned embodiments only describe the preferred embodiments of the present invention and do not limit the scope of the present invention. Without departing from the design spirits of the present invention, those of ordinary skill in the art have made various modifications and improvements to the technical solutions of the present invention. Such modifications and improvements shall fall within the protection scope determined by the claims of the present invention.

What is claimed is:

1. A wall-thickness additive manufacturing device for micro cast-rolling additive manufacturing of large-scale special-shaped pipe, comprising: a vertical wall, a heat-insulating cover, a crossed slide assembly and a laser cladding assembly; wherein the vertical wall is horizontally provided on a ground; the crossed slide assembly is fixedly connected to the vertical wall by bolt; the laser cladding assembly is fixedly connected to an upper part of a longitudinal slide of the crossed slide assembly by bolt, wherein:

the vertical wall has a shape of a T-shaped structure; the heat-insulating cover comprises a heat-insulating cover base, a heat-insulating right cover portion and a heat-insulating left cover portion; the heat-insulating right cover portion and the heat-insulating left cover portion are connected to an upper part of the heat-insulating cover base by pin; the crossed sliding platform assembly comprises a transverse slide structure, a longitudinal slide structure, a hexagon nuts and hexagon bolts;

the longitudinal slide structure comprises a first ball screw bearing seat, a longitudinal slide, a longitudinal slide guide, a first stepping motor, a first ball screw, a first crash pad, a first coupling, a first longitudinal ball screw nut, a second longitudinal ball screw nut, a first stepping motor seat and a first bearing end cover; in the longitudinal slide structure, an input end of the first ball screw passes through an inner diameter of the second longitudinal ball screw nut and an inner diameter of the first crash pad and is connected to an output shaft of the first stepping motor through the first coupling, and a free end of the first ball screw is fixedly connected to the longitudinal slide guide through the first ball screw bearing seat and the first bearing end cover, the first longitudinal ball screw nut is fixedly connected to a first end of the first stepping motor seat, an outer diameter of the second longitudinal ball screw nut is fixedly connected to an inner surface of the longitudinal slide;

the transverse slide structure comprises a second ball screw bearing seat, a transverse slide, a transverse slide guide, a second ball screw, a second stepping motor, a second coupling, a second crash pad, a first transverse ball screw nut, a second transverse ball screw nut, a second stepping motor seat and a second bearing end cover; in the transverse slide structure, an input end of the second ball screw passes through an inner diameter of the second transverse ball screw nut and an inner diameter of the second crash pad and is connected to an output shaft of the second stepping motor through the second coupling, and a free end of the second ball screw is fixedly connected to the transverse slide guide through the second ball screw bearing seat and the second bearing end cover, the second transverse ball screw nut is fixedly connected to a first end of the second stepping motor seat, an outer diameter of the second transverse ball screw nut is fixedly connected to an inner surface of the transverse slide;

the transverse slide and the longitudinal slide each have a cross section of U-shaped structure, a lower part of the transverse slide is slidingly connected to an upper part of the transverse slide guide, a lower part of the longitudinal slide guide is fixedly connected to an upper part of the transverse slide, a lower part of the longitudinal slide is slidingly connected to the upper part of the longitudinal slide guide, and the first stepping motor seat and the second stepping motor seat are respectively fixedly connected to one end of the longitudinal slide guide and one end of the transverse slide guide, the first stepping motor and the second stepping motor are respectively fixedly connected to the first end of the first stepping motor seat and the first end of the second stepping motor seat, and one end of the first crash pad and one end of the second crash pad are respectively fixedly connected to a second end of the first stepping motor seat and a second end of the second stepping motor seat, and the first ball screw and the second ball screw are respectively in thread connection with the first longitudinal ball screw nut, the second longitudinal ball screw nut, the first transverse ball screw nut and the second transverse ball screw nut; and the laser cladding assembly comprises a welding frame, a storage barrel, a conical pin, a laser head, and a welding head, the welding frame has a shape of an oblique T-shaped structure, the storage barrel is fixedly connected to the welding frame, a top surface of the storage barrel is flush with a lower surface of a cantilever end of the welding frame, the laser head is connected to a lower surface of the cantilever end of the welding frame through the conical pin, and the welding head is fixedly connected to the lower surface of the cantilever end of the welding frame;

wherein a distance between the storage barrel and a top surface of the cantilever end of the welding frame is greater than a distance between the laser head and the top surface of the cantilever end of the welding frame, and a distance between the laser head and the top surface of the cantilever end of the welding frame is greater than a distance between the welding head and the top surface of the cantilever end of the welding frame, and a width of the longitudinal slide guide is equal to a width of the transverse slide;

wherein the longitudinal slide guide and the transverse slide guide are perpendicular to each other, and an axis of the first ball screw is perpendicular to an axis of the second ball screw;

wherein the longitudinal slide guide and the transverse slide guide are perpendicular to each other, and an axis of the first ball screw is perpendicular to an axis of the second ball screw.

* * * * *